Feb. 13, 1940.    M. J. MILMOE ET AL    2,190,620
ARTICLE FEEDING MECHANISM
Filed Feb. 15, 1937    4 Sheets-Sheet 3
FIG_5
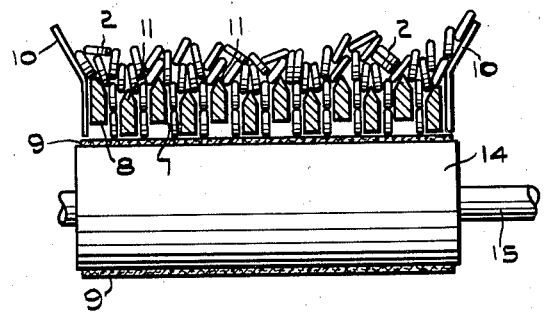
FIG_6
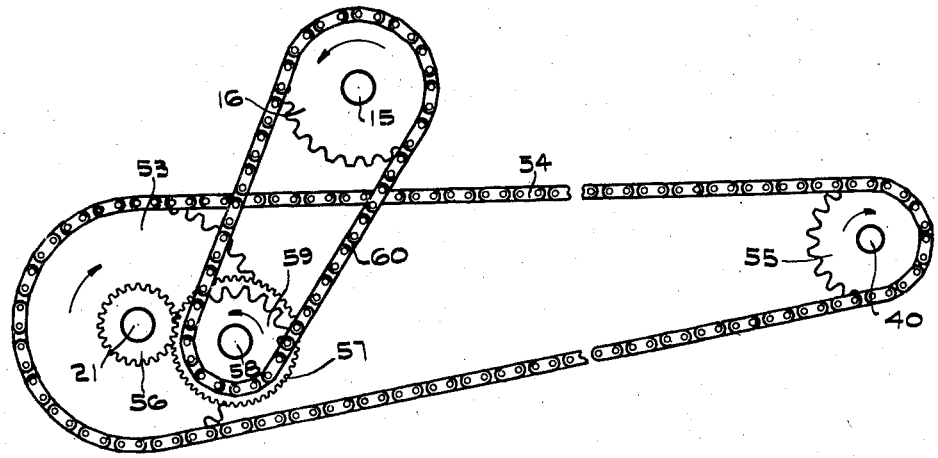
INVENTORS.
Michael J. Milmoe and
Clarence J. Malhiot
BY: Cox & Moore
ATTORNEYS.

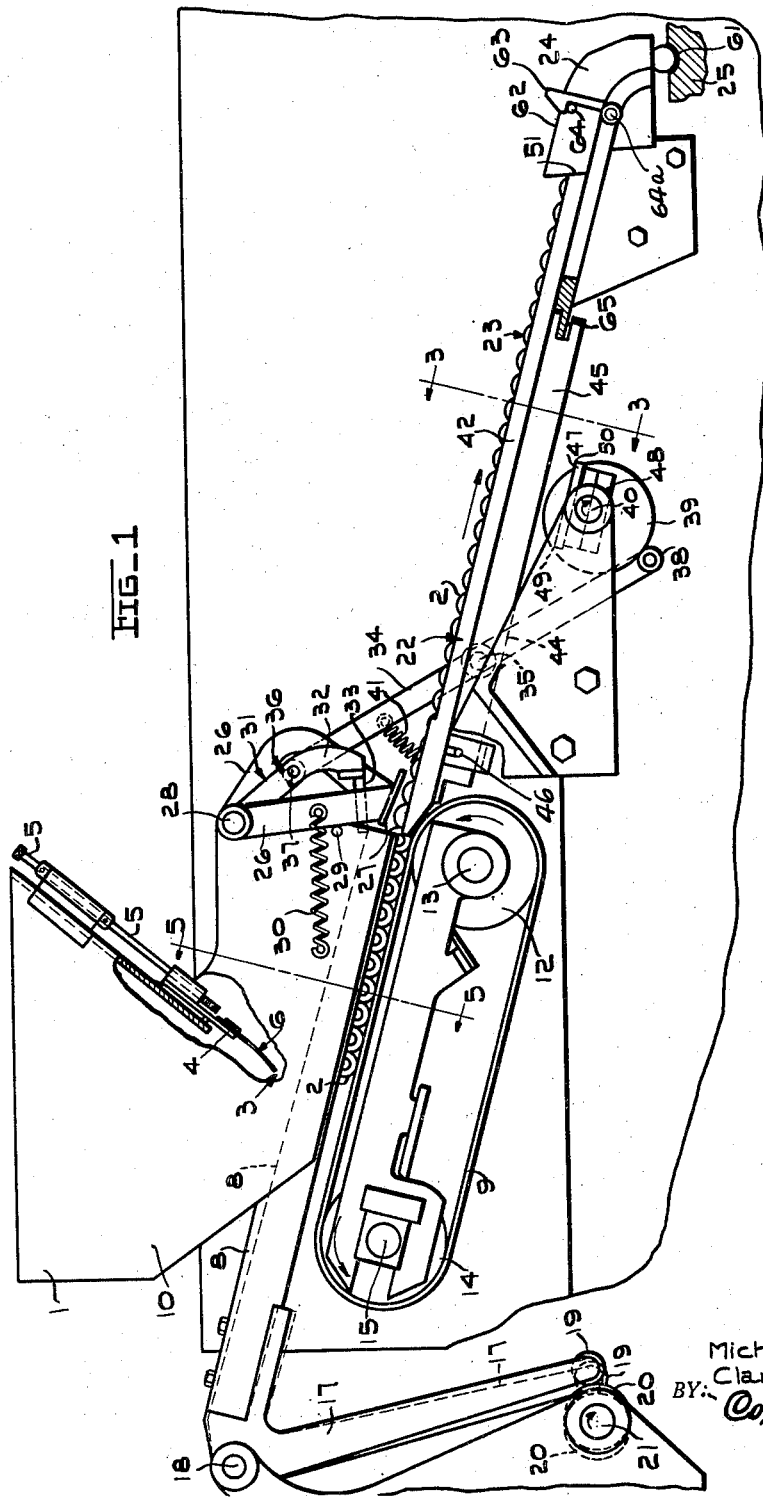

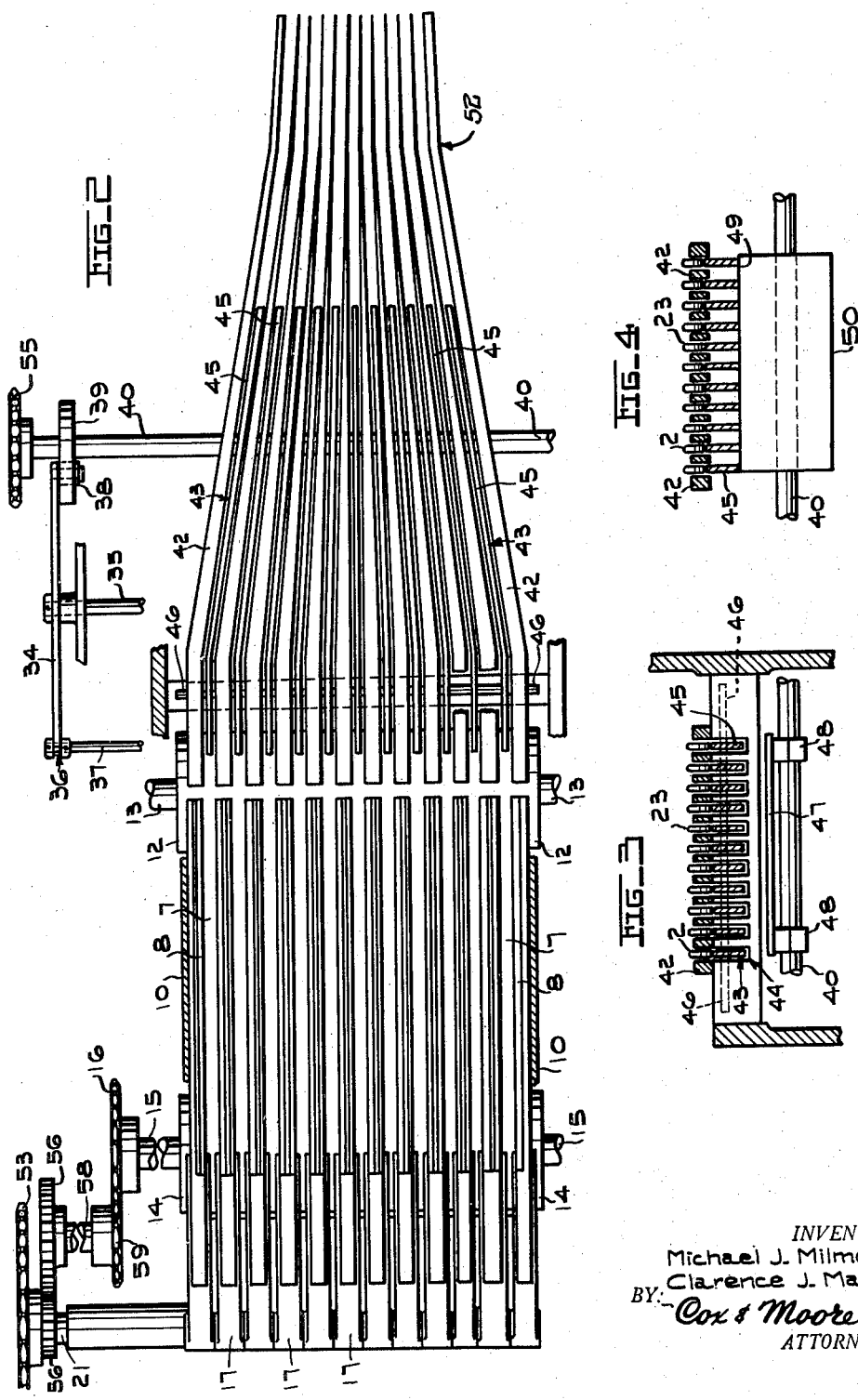

Feb. 13, 1940.    M. J. MILMOE ET AL    2,190,620
ARTICLE FEEDING MECHANISM
Filed Feb. 15, 1937    4 Sheets-Sheet 4
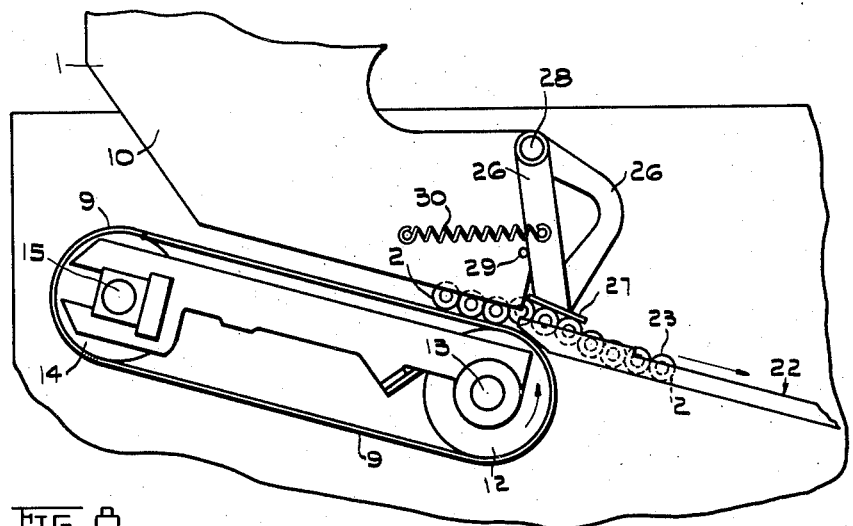
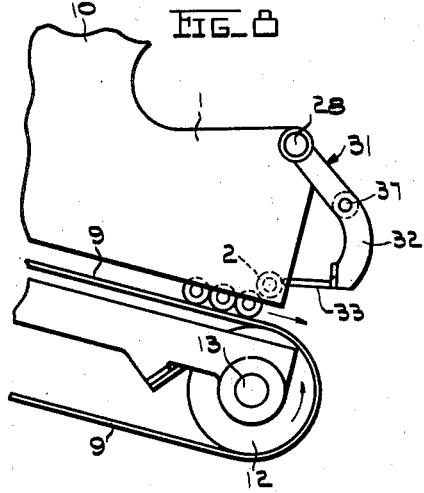
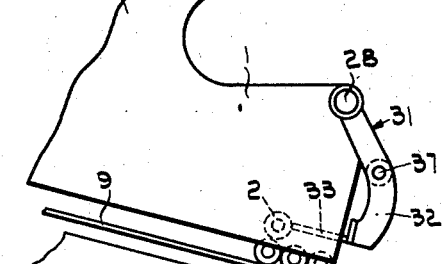
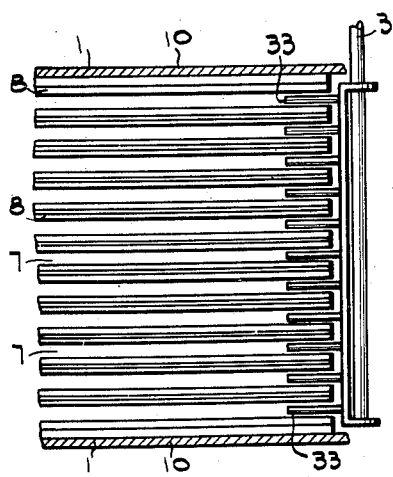
INVENTORS.
Michael J. Milmoe and
Clarence J. Malhiot
BY: Cox & Moore
ATTORNEYS.

Patented Feb. 13, 1940

2,190,620

UNITED STATES PATENT OFFICE 2,190,620

ARTICLE FEEDING MECHANISM

Michael J. Milmoe, Glen Ellyn, and Clarence J. Malhiot, Oak Park, Ill., assignors to F. B. Redington Co., Chicago, Ill., a corporation of Illinois Application February 15, 1937, Serial 125,805

9 Claims. (Cl. 198—30)

This invention relates to wrapping machines in general and more particularly feeding mechanism for feeding articles to predetermined positions where they may be subsequently packaged and wrapped.

An important object of the invention is the provision of means for agitating and positioning a plurality of disk-shaped articles into a predetermined feeding position, causing the said articles to each attain a particular position, and then moving the article in the attained position to predetermined locations, the articles, after being fed to a predetermined position, being collected and wrapped or packaged in a predetermined manner.

Another object of the invention is the provision of a hopper and feeding means for feeding disk-shaped articles, such as disks of candy or other confection, by agitating the articles in the hopper so that the articles will be positioned on a peripheral surface, the articles then being caused to move on their peripheral surface to various positions for packaging and wrapping.

Further objects of the invention are the provision of new and improved means for feeding a plurality of articles from a hopper, the hopper being adjustable so as to regulate the feeding of the elements; the provision of means for causing the disk-shaped articles to be arranged in position on their peripheral surface in rows, there being means to cause the articles to be fed continuously in a predetermined position and movable about their peripheries, and to prevent the articles from riding one upon the other.

Numerous other objects and advantages will be apparent throughout the progress of the following specification.

The accompanying drawings herein illustrate a selected embodiment of the invention and the views therein are as follows:

Fig. 1 is a detail elevational view of an improved feeding mechanism and embodying the invention.

Fig. 2 is a detail plan view thereof.

Fig. 3 is a detail vertical sectional view on the line 3—3 of Fig. 1.

Fig. 4 is a similar view showing the agitating plate in a different or agitating position.

Fig. 5 is a detail sectional view on the line 5—5 of Fig. 1.

Fig. 6 is a detail view showing some of the operating and driving mechanism.

Fig. 7 is a detail elevational view showing certain mechanism to assist in arranging and positioning the articles.

Fig. 8 is a view similar to Fig. 7 showing the jogger mechanism in a predetermined position.

Fig. 9 is a view similar to Fig. 8 but showing the jogger mechanism in another position.

Fig. 10 is a detail plan section of some of the feeding mechanism and the agitating means cooperating therewith.

The particular feeding mechanism herein disclosed for the purpose of illustrating the invention may be attached to existing machines or it may be incorporated in new machines.

This feeding mechanism comprises a hopper 1, Fig. 1, which may be mounted on suitable supports either attached to or disassociated from the packaging or wrapping machine to which the invention may be applied. The hopper 1 is adapted to receive a plurality of articles, such as disk-shaped confectionery pieces 2, which are fed through an opening 3, Fig. 1, the size of which opening is adjustable by means of a slide shutter 4 controlled by an adjustment screw or element 5. If desired, and as shown in Fig. 1, the end of the shutter 4 is made of soft rubberlike material indicated generally by the numeral 6. The articles which are shown as being circular, in the form of disks, are put in the hopper and fall in the spaces 7 between the spaced bars 8. The spaces 7 between the bars 8 are slightly larger than the thickness of an article 2 so that the articles will stand on edge, that is, they will ride along their peripheries and engage a conveyor 9, Fig. 5. Sides 10 are connected to the hopper and extend downwardly forming guides so as to prevent the articles from falling off of the feeding mechanism.

The bars 8, Fig. 5, are elongated and slope downwardly as shown in Fig. 1, said bars being rectangular at their bottom edges and extend upwardly terminating in V-shaped points 11, Fig. 5, whereby to cause the articles to more readily find their way into the spaces 7 between the bars.

The conveyor 9 is inclined in a downwardly direction toward the right in Fig. 1 and is operated in the direction shown by the arrows in Fig. 1. It is found that by moving the conveyor belt in an upward direction while the material tends to roll downwardly in an opposite direction, the articles are assisted in finding the spaces between the bars as well as prevented from piling up. By having the belt 9 arranged underneath the hopper and traveling in a direction opposite to the movement of the disks, jamming of the disks at the opening is also prevented and the belt carries any chips, broken pieces and other matter upwardly and out of the machine rather than into it.

The conveyor 9 comprises a belt passing over a roller 12 mounted on a shaft 13. The belt of the conveyor also passes over a second wheel or pulley 14 mounted on a shaft 15, Figs. 1 and 5, which is driven from a sprocket 16, Fig. 2.

The bars 8 are spaced, as clearly shown in Figs. 2 and 5, and are rigidly connected at their upper ends, Fig. 2, to spaced arms 17 pivotally connected at 18, Fig. 1, to a part of the supporting structure. The arms 17 carry rollers 19 at their lower ends, these rollers riding on cams 20 fixed to a rotating shaft 21. The arms are so arranged and constructed and co-operate with the cams 20 in such manner that one set of alternate rollers 19 will be in engagement with the high side of one-half of the cams 20 when the other set of alternate rollers 19 is in engagement with the low side of the other half of the cams 20. Therefore, during rotation of the shaft one set of alternate arms 17 will be operated in one direction while the other set of alternate arms will be operated in an opposite direction. Therefore, during continuous operation of the shaft 21 adjacent bars 8 will be raised and lowered alternately. This arrangement tends to agitate the disks 2 so as to cause them to position themselves between the bars 8 and in the spaces 7 between the bars, whereby the articles will ride along their peripheral edges on the belt or conveyor 9.

The articles 2 then roll by gravity down the belt, Fig. 1, to the receiving element or tray 22 where they are free to roll by gravity in several rows 23, Fig. 1, and through the discharging chute 24 into a grooved receiving platform or element 25. After the disks are arranged in the receiving element 25, they are moved laterally to a predetermined position or positions where they are packaged and wrapped.

As the articles pass from the hopper toward the receiving member or element 22 they tend to bunch up, that is, stack one upon the other. To overcome this bunching up or stacking, a presser arm 26 having a presser foot 27 is provided, Figs. 1 and 7. This presser arm, which may comprise one or more elements, is loosely mounted on a transverse shaft or pin 28 and is positioned immediately above the upper surfaces of the disks 2 but normally out of contact therewith. If a disk in passing from the conveyor 9 to the tray 22 moves outwardly or upwardly, it engages the foot 27 and is guided downwardly thereby into proper position on the receiving tray. A pin 29 may be provided to limit the movement of the arm 26 to the left. If desired, a light spring 30 may be attached to the arm 26 to urge it against its pin 29 but to allow it to swing on its pivot 28 in a direction away from the pin. However, the weight of the presser arm itself may be sufficient to hold the articles in position and guide them from the belt 9 onto the receiving tray 22.

To prevent the articles 2 from piling up and jamming at the lower end of the belt 9 and the upper end of the receiving tray 22, a jogger mechanism 31 may be provided, Figs. 1, 8 and 9. This jogger mechanism comprises a jogger arm 32 having a plurality of jogger fingers 33, Fig. 10. This jogger arm is also pivotally mounted to the shaft 28 and is operated by a rod or link 34 pivotally mounted at 35 to a part of the structure. The upper end of the link 34 is bifurcated as indicated at 36, Fig. 1, and receives a pin 37. The lower end of the link 34 carries a cam roller 38, Fig. 1, which engages a cam 39 fixed to a driven jogger shaft 40, there being a spring 41, Fig. 1, connected to the arm 34 to urge the cam roller 38 against the cam 39.

The receiving tray 22 comprises a plurality of stationary guides or bars 42 providing spaces 43 into which the disks 2 pass from the belt 9. The spaces 43 are relatively deep, being cut down in the framework as indicated at 44, Fig. 3. Bars 45 are arranged in these spaces 43 and support and engage the lower peripheral edges of the articles 2. These bars 45 are arranged between the bars 42 and have their upper ends rigidly mounted on a pin 46, Figs. 2 and 3, which pin is removably received in a slotted support in the frame.

The jogger shaft 40 may have fixed thereto a plate 47, fixed thereto by means of the bearings or fastening journals 48, Fig. 3. Therefore, when the jogger shaft 40 is rotating, the plate 47 will be caused to rotate and engage the lower edges of the bars 45, causing raising and lowering of the bars 45 each time an edge of the plate 47 strikes the bottom of the bars. The bars 45 are caused to raise and lower twice during each revolution of the jogger shaft 40 because the edges 49 and 50, Fig. 4, will strike the bottom edges of the bars 45 during each revolution of the shaft 40. This raising and lowering of the bars 45 causes the disks 2 in the rows 23 to separate slightly and facilitate the rolling of the articles toward the discharge nozzle 24.

The receiving tray 22 has its upper end in proper spaced relationship with the outlet edge of the hopper, that is, at the end of the belt, and then the guides 42 converge inwardly as do the supporting bars 45. The converging or slanting sides of the receiving element 22 form a straight line at the edge 51 where the articles engage the nozzle. The inclination or tapering of the receiving tray 22 decreases at the point indicated by the numeral 52, Fig. 2.

The articles are caused to roll by gravity from the hopper 1 through the receiving nozzle 24 and on to the receiving element 25. However, means are provided to agitate the articles as they come out of the hopper so that they will find their positions in the spaces 7 between the spaced bars 8. Also, the articles 2 are maintained in proper position on the receiving tray 22, there being jogger means provided to keep the articles from bunching up when they leave the conveyor 9, as well as a presser foot 27 to hold the articles from jumping out of position as they arrive at the receiving tray 22. Also, the bars 45 in the receiving tray cause the articles in the rows 23 to be slightly separated by the agitation of the plate 47 so as to keep the articles rolling continuously until they reach the proper discharge point. In Fig. 6 means are provided for causing the parts to operate each in proper timed relationship with the other.

The shaft 21, which is the agitating shaft for agitating the arms 17, may be the drive shaft and it carries a sprocket gear 53 which drives a sprocket chain 54. This sprocket chain drives a sprocket gear 55 which is fixed to the jogger shaft 40. The drive shaft 21 also carries a gear 56 which meshes with an idler gear 57 mounted on a stud shaft 58 and drives this stud shaft 58. This stud shaft 58 also carries a sprocket 59 and drives the sprocket 16 on the shaft 15 through the medium of a sprocket chain 60, Figs. 6 and 2. The shaft 21 drives the cams 20 for causing operation of the bars 8; the hopper shaft 15 drives the conveyor 9; and the jogger shaft 40 drives the jogger mechanism 31 and the agitating bars 45. The entire device is, therefore, arranged and constructed to operate the device synchronously and in timed relationship so that correlated operation of the device is assured.

Operation

Articles 2, such as candy disks, are placed into the hopper 1 and are fed from the hopper through the hopper opening 3, the size of the opening 3 being governed by the member 4. The articles in the hopper are caused to fall into position in the spaces 7 between the spaced bars 8 which are raised upwardly and downwardly by the arms 17 operated alternately by the cams 20. The articles 2 roll down the top surface of the belt 9 which moves in a direction counter to the normal gravity movement of the articles as they roll toward discharge position.

At the point where the receiving tray connects with the hopper, which is the point where the disks leave the belt, a jogger element is caused to operate to prevent the disks from piling, the jogger element shifting back and forth as shown in Figs. 8 and 9, to prevent jamming and to maintain the articles in full rows. This jogger element or mechanism 31 is operated by the arm 34 controlled by the rotating cam 39. The presser arm 26—27 keeps the disks from jumping out of position as they leave the hopper at the end of the belt and pass onto the receiving tray 22.

The receiving tray or member is provided with spaced bars, the tops of which act as supports for the peripheral edges of the disks. To keep the rows or lines 23 of the articles 2 from jammin and a facilitate the rolling of the articles down the receiving tray to the discharge nozzle the agitating mechanism is provided. The agitating mechanism includes the bars 45 which are raised and lowered by the engagement of the edges 49 and 50 of the plate 47. The disks 2 are so arranged on the tray 22 that they are fed to the discharge point in parallel lateral rows. They then pass through the discharge nozzle 24 onto a receiving element 25. The receiving element may be provided with a transverse groove having its surface dished or it may be provided with a plurality of grooves 61, Fig. 1, conforming with the circular outline of the articles themselves. The articles are then moved, by means not shown, laterally into a package receptacle or are directly packaged by any suitable wrapping mechanism.

If desirable, the number of rows 23 of the articles may be the number of articles that are going to be contained in one package. In the present embodiment shown, there will be eleven rows 23 of articles 2 so that when one article from each row is discharged, the entire eleven articles may be wrapped or packaged. Of course, the number of rows and the number of operating mechanisms may be varied to suit conditions as well as to suit the method of packaging. The element 25 may be progressively operated so that as soon as one lateral row of devices is received in a notch a next depression or notch may be brought into position to receive the next succeeding lateral row of disks 2. In other words, each time as the element 25 moves it will receive eleven articles, or as many articles as there are longitudinal rows 23. The operation, therefore, can be made continuously.

The discharge end 24 may be provided with a cover 62 to prevent the articles 2 in the rows 23 from jumping or falling out of position. The cover 62 may be held in position by a catch 63 engaging a pin 64, the catch being pivotally or otherwise connected at 64a to a part of the frame.

The conveyor structure may have the parts 10 joined by a tongue and groove joint 65, Fig. 1, to connect the parts together and to insure synchronized and correlated operation and to cause the agitating movement to be properly transmitted.

The invention provides new and novel feeding mechanism whereby a plurality of articles to be wrapped are fed from a hopper to a feeding position by gravity. The parts constituting the feeding mechanism can be economically manufactured and are so correlated as to be capable of synchronous operation.

Changes may be made in the form, construction and arrangement of the parts without departing from the spirit of the invention and without sacrificing any of its advantages and the right is hereby reserved to make all such changes as fairly fall within the scope of the following claims.

The invention is hereby claimed as follows:

1. Article feeding mechanism comprising a hopper having a discharge outlet through which articles may pass, a continuous conveyor having a downwardly inclined surface to receive the articles from the discharge outlet, means for operating said conveyor in a direction opposite to its inclined direction, and means for positioning said articles on said conveyor.

2. Article feeding mechanism comprising a hopper, a continuous conveyor having a downwardly inclined surface to receive the articles from the hopper, means for operating said conveyor in a direction opposite to its inclined direction, and means above the conveyor to position said articles on said conveyor and to agitate said articles to assist in the positioning of said articles in rows thereon.

3. Article feeding mechanism comprising a hopper, a conveyor having a downwardly inclined surface to receive the articles from the hopper, means for operating said conveyor in a direction opposite to its inclined direction, means above the conveyor to position said articles on said conveyor and to agitate said articles to assist in the positioning of said articles in rows thereon, a receiving element upon which said articles are received from said conveyor, and means for positioning said articles in rows on said element.

4. Feeding mechanism comprising a hopper having a discharge outlet through which disk-shaped articles may pass, a conveyor having a downwardly inclined receiving surface on which the articles are received from said discharge outlet, means for operating said conveyor in a direction opposite to the direction of its inclination, a plurality of spaced bars supported above the conveyor, and means for agitating said bars to cause said articles to be positioned in the spaces between the bars with their peripheral surfaces engaging the receiving surface of the conveyor and to cause said articles to roll uniformly down the surface of said conveyor.

5. Feeding mechanism comprising a hopper having a discharge outlet through which articles may pass, a continuous conveyor having a downwardly inclined receiving surface on which the articles discharged from said outlet are received and roll downwardly by gravity, spaced bars supported adjacent the hopper and between which the articles are received, means to agitate the bars properly to position the articles in rows on said conveyor, a receiving member for receiving the articles from said conveyor, and presser means for guiding the articles into prearranged positions on the receiving member.

6. Feeding mechanism comprising a hopper having a discharge outlet through which articles may pass, a continuous conveyor having a downwardly inclined receiving surface on which the articles discharged from said outlet are received and roll downwardly by gravity, spaced bars supported adjacent the hopper and between which the articles are received, means to agitate the bars, a receiving member for receiving articles from said conveyor, jogger means for assisting in preventing the articles from piling and for preventing any piled articles from jamming in moving from said conveyor to said receiving member, and means for operating the jogger means.

7. Feeding mechanism comprising a hopper having a discharge outlet through which articles may pass, a continuous conveyor having a downwardly inclined receiving surface on which the articles discharged from said outlet are received and roll downwardly by gravity, spaced bars supported adjacent the hopper and between which the articles are received, means to agitate the bars properly to position the articles on said conveyor and to cause the articles to roll uniformly down the inclined surface of said conveyor, a receiving member for receiving articles from said conveyor, presser means for guiding the articles into prearranged positions on the receiving member, jogger means for assisting in preventing the articles from piling and for preventing any piled articles from jamming in moving from the conveyor onto said member, and means for operating the jogger means.

8. Feeding mechanism comprising a hopper having a discharge outlet through which articles may pass, a continuous conveyor having a downwardly inclined receiving surface on which the articles discharged from said hopper are received and roll downwardly by gravity, spaced bars arranged adjacent the hopper and between which the articles are received, means for agitating the bars to position the articles properly in rows on said conveyor, means for operating said conveyor in the direction opposite to the direction of its inclination, a receiving member for receiving articles from the conveyor, said receiving member having a plurality of spaced bars in alinement with the first mentioned spaced bars and a plurality of shiftable bars between said last mentioned spaced bars, said shiftable bars having downwardly inclined surfaces to receive the articles, jogger means for preventing piling up and jamming of the articles in moving from the conveyor to and between the spaced bars of the receiving member and onto the shiftable bars of said receiving member, and means for agitating said last mentioned shiftable bars.

9. Feeding mechanism comprising a hopper having a discharge outlet through which articles may pass, a continuous conveyor having a downwardly inclined receiving surface on which the articles discharged from said outlet are received and roll downwardly by gravity, spaced bars arranged adjacent the hopper and between which the articles are received, means for agitating the bars to position the articles properly in rows on said conveyor, means for operating said conveyor in the direction opposite to the direction of its inclination, an article receiving member for receiving articles from the conveyor, said member having a plurality of spaced bars in alinement with the first mentioned spaced bars, and a plurality of shiftable bars between said last mentioned spaced bars, said shiftable bars having downwardly inclined surfaces to receive the articles, jogger means for preventing piling up and jamming of the articles in moving from the conveyor to and between the spaced bars of the receiving member and onto the shiftable bars of said member, means for agitating said last mentioned shiftable bars, a grooved platform at the end of the receiving member, and means for positioning the articles from the receiving member into the groove in the platform.

MICHAEL J. MILMOE.
CLARENCE J. MALHIOT